United States Patent Office 3,631,028
Patented Dec. 28, 1971

3,631,028
PROCESS FOR PRODUCING 6-ACYLAMINO-PENICILLANIC ACIDS
Yukichi Kishida, Junichi Nakazawa, Hidebumi Matsuda, Yoshio Sato, Toshihide Miyamura, and Takako Watatani, Tokyo, Japan, and Mitsuo Watatani, deceased, late of Tokyo, Japan, by Takako Watatani, heiress, Yokohama, and Tetsuo Hiraoka, Tokyo, Japan, assignors to Sankyo Company Limited, Tokyo, Japan
No Drawing. Filed Nov. 4, 1969, Ser. No. 874,048
Claims priority, application Japan, Nov. 6, 1968,
43/81,125
Int. Cl. C07d 99/24
U.S. Cl. 260—239.1  9 Claims

ABSTRACT OF THE DISCLOSURE

An improved process for the production of 6-acylaminopenicillanic acids comprises forming 6-salicylideneaminopenicillanic acid-salicylaldehyde adduct by adding to a fermented broth containing 6-aminopenicillanic acid two moles or more of salicylaldehyde per mole of said 6-aminopenicillanic acid, and then acylating the said adduct.

BACKGROUND AND SUMMARY OF THE INVENTION

This invention relates to a new process for producing 6-acylaminopenicillanic acids or salts thereof.

The 6-acylaminopenicillanic acids as referred to in this invention include, besides natural penicillins, many medically useful semi-synthetic penicillins having different acyl radicals. These semisynthetic penicillins have hitherto been produced by reaction of an acylating agent on 6-aminopenicillanic acid (hereinafter abbreviated as "6–APA") or a salt thereof. In such a process the 6–APA to be used as the starting material is produced, on an industrial scale, either by enzymatically decomposing a natural penicillin, for instance penicillin G, with microorganic penicillin amidase or directly by fermentation. However, the 6–APA thus obtained exists in dilute solution in the fermentation fluid, and due to its low purity and concentration its immediate acylation is disadvantageous. In order to isolate it from the fermented broth, the 6–APA should first be converted into its derivative, for instance a Schiff's base thereof or salt of such a Schiff's base with a higher aliphatic secondary amine, which is then separated from the fermentation broth either by precipitation or by extraction with an organic solvent and later decomposed to 6–APA. The semi-synthetic penicillins are usually produced by treating the 6–APA thus separated and purified with acylating agents.

After comprehensive studies with the aim of finding a commercially advantageous proces for producing 6-acylaminopenicillanic acids, we have discovered that 6-acylaminopenicillanic acids can be obtained by adding salicylaldehyde to a fermented broth containing 6–APA to form 6-salicylideneaminopenicillanic acid-salicylaldehyde adduct (hereinafter called "adduct") and then acylating the adduct.

DETAILED DESCRIPTION OF THE INVENTION

According to the process of this invention, it is possible to produce 6-acylaminopenicillanic acids by direct acylation of the adduct obtained by the reaction of salicylaldehyde on the 6–APA in a fermented broth, and therefore it involves fewer steps and simpler operations than in the conventional processes, Furthermore, because of low solubility of 6–APA in water or organic solvents, acylation of 6–APA by the conventional processes requires dissolving 6–APA by the use of a strong acid or alkali, or addition of the acylating agent to a 6–APA suspension. On the other hand, since the adduct, which is the starting material of the acylation in the process of this invention, is readily soluble in organic solvents, and moreover, is stable in solution, the reaction proceeds very smoothly and the desired product can be produced in a high yield. The salicylaldehyde used can be recovered almost quantitatively and employed repeatedly for the reaction.

The process of this invention is carried out by the following two major stages: (1) the stage of producing the adduct by adding salicylaldehyde to a fermented broth containing 6–APA, and (2) that of producing the desired 6-acylaminopenicillanic acid by acylating the adduct.

The stage (1) can be easily carried out by adjusting the pH of a hydrolyzed broth of a natural penicillin, for example penicillin G, to between 6 and 9 and adding 2 moles or more of salicylaldehyde per mole of 6–APA in said fluid followed by stirring. While there is no limitation on the reaction temperature, temperatures from 0° to 30° C. are preferable, and the reaction is completed in several minutes to several hours. After completion of the reaction, the adduct is isolated from the reaction mixture by a conventional procedure. For instance, after the reaction is completed, a water-immiscible solvent, e.g., ether, acetic ester, butanol, methyl ethyl ketone or chloroform, is added to the reaction mixture, and then the pH of the aqueous layer is adjusted to about 2 to 4 with an acid, such as phosphoric, hydrochloric, sulfuric, citric or phthalic acid, or an acid salt, for example acid sodium phosphate, thereby transferring the adduct to the solvent layer, and the latter is then separated.

The adduct solution thus obtained as such may be employed for the next stage: alternately, the above solution may be washed with water, dried and the solvent distilled off. The adduct thus isolated may be employed for the next stage, if desired after further purification.

The stage (2) can be conducted by adding an acylating agent to the adduct solution obtained in the stage (1) or the solution of the isolated adduct in a suitable solvent followed by stirring. Any solvent which will not participate in the reaction can be used for this procedure, but the preferred solvents include water-miscible ones, e.g., acetone, tetrahydrofuran or dioxane. As the acylating agents may be mentioned organic acids, such as active derivatives of organic acid such as aliphatic, aromatic or aliphatic and heterocyclic carboxylic acids, for example, acid halides, such as acid chlorides, bromides and iodides; active esters, such as cyanomethyl ester, esters with phenols, e.g., nitrophenol or chlorophenol, esters with N-hydroxyimides, e.g., N-hydroxysuccinimide and N-hydroxyphthalimide, or esters with thiophenols, e.g., thiophenol or nitrothiophenol; acid anhydrides, such as carboxylic anhydrides, mixed acid anhydrides and N-carboxylic anhydrides. Combination of a carboxylic acid with a dehydrating agent, such as dicyclohexylcarbodiimide or carbonyldiimidazole, may be used as well. The most preferable method of acylation is the use of an acid halide as the acylating agent. If the organic acid derivative used for the acylation has, in addition to the carboxyl which takes part in the reaction, a functional group or groups, for example an amino, carboxyl or hydroxyl radical, it is desirable to protect such a functional group with an easily removable group, such as benzyloxycarbonyl, trifluoroacetyl, formyl or t-butoxycarbonyl for the amino group; benzyl, allyl or tetrahydropyranyl for the hydroxy group; benzyl for the carboxylic group, in advance of the acylation reaction, and this protection is then removed after the reaction.

While the reaction is effected under conditions from weakly alkaline to weakly acidic, it is preferable to carry out the reaction under weakly acidic condition. The desirable temperature ranges from 0° to 25° C., but the reaction can be effected at a higher or lower temperature. The reaction is completed in a period from several minutes to several hours.

After the reaction has been completed, the desired 6-acylaminopenicillanic acid is isolated from the reaction mixture by a conventional method. For instance, the desired product is obtained by concentrating the reaction mixture, extracting the concentrate with a solvent such as ether, washing with water and drying the extract and distilling the solvent off. The product may be purified by recrystallization and chromatography as required, or may be converted into non-toxic salts.

This invention is an improved process for producing 6-acylaminopenicillanic acid, and the compounds thereby produced include not only all the natural and semi-synthetic penicillins which are considered therapeutically useful but also 6-acylaminopenicillanic acids from which such penicillins can be derived by chemical treatment. Typical of such 6-acylaminopenicillanic acids include:

6-(2-phenylacetamido)-penicillanic acid
6-(2-phenoxyacetamido)-penicillanic acid
6-(2-phenoxypropionamido)-penicillanic acid
6-(2,6-dimethoxybenzamido)-penicillanic acid
6-(3-phenyl-5-methyl-4-isoxazolecarboxamido)-penicillanic acid
6-[3-(o-chlorophenyl)-5-methyl-4-isoxazolecarboxamido]-penicillanic acid
6-[3-(2,6-dichlorophenyl)-5-methyl-4-isoxazolecarboxamido]-penicillanic acid
6-(2-amino-2-phenylacetamido)-penicillanic acid
6-(2-azido-2-phenylacetamido)-penicillanic acid
6-(2-bromo-2-phenylacetamido)-penicillanic acid
6-[2-(p-toluenesulfonylethoxycarbonylamino)-2-phenylacetamido]-penicillanic acid
6-(β-methoxypropionamido)-penicillanic acid
6-[2-(o-nitrophenylsulfenylamino)-2-phenylacetamido]-penicillanic acid
6-(2-methoxy-1-naphthamido)-penicillanic acid
6-(2-ethoxy-1-naphthamido)-penicillanic acid and salts thereof, such as the sodium or potassium salts.

By way of example, the process of this invention will be described more specifically.

EXAMPLE 1

Hydrolyzed fermentation broth of penicillin G is filtered, and 1 liter of the filtrate (containing 4,320 mg. of 6-APA) is adjusted to pH 6.5. The solution is cooled to 8° C., followed by addition of 4.9 g. of salicylaldehyde, and the mixture is stirred for 2 hours. To the reaction mixture is added 600 ml. of ethyl acetate; pH of the aqueous solution is adjusted to 3.7 by addition of 1 N sulfuric acid with stirring; the solvent layer is separated and, after drying over anhydrous sodium sulfate, the solvent is distilled off. The residual viscous oily substance crystallizes after being allowed to stand, and the crystals are washed with cyclohexane to give 4.42 g. of light yellow crystals melting at 83° to 90° C. The crystals consist of a 1:1 adduct of 6-salicylideneaminopenicillanic acid and salicylaldehyde.

The adduct is dissolved in a mixture of 130 ml. of acetone and 3 ml. of water, and a solution of 3.2 g. of 3-(2′,6′-dichlorophenyl)-5-methylisoxazole-4-carbonyl chloride in 20 ml. of acetone is dropped little by little into the mixture at a temperature of 20° C., while maintaining the pH of the reaction mixture between 3.0 and 3.5, by dropwise addition of a 10% aqueous solution of sodium hydroxide. The addition is completed in about 4 hours, and stirring is continued for an additional 30 minutes. The reaction mixture is concentrated under reduced pressure to about ⅓ of the initial quantity, and 600 ml. of water is added to the mixture, which then is subjected to extraction with ether. After the ether extract is washed with saturated saline solution and dried over anhydrous sodium sulfate, 5 ml. of a 2 N n-butanol solution of the sodium salt of α-ethylhexanoic acid is added to the ether solution. Crystals which separate are collected and washed with ether to give 4 g. of sodium 6-[3-(2′,6′-dichlorophenyl)-5-methyl - 4 - isoxazolecarboxamido]-penicillanate.

EXAMPLE 2

3.7 g. of salicylaldehyde is added to 500 ml. of the filtrate from hydrolysis of fermented broth of penicillin G (containing 4,320 mg./l. of 6–APA) the pH of the solution is adjusted to 6.3, and the mixture is stirred for 2 hours. To the reaction mixture is added 300 ml. of ether, followed by addition of an aqueous solution of 1 M phosphoric acid under cooling with ice to adjust the pH of the aqueous solution to 3.5. After separating the ether layer and drying it over anhydrous sodium sulfate, the solvent is distilled off. Then after adding 10 ml. of cyclohexane to the residue and stirring the mixture sufficiently, most of the cyclohexane is decanted and the remaining solvent is further distilled off to yield 2.8 g. of a crude oily adduct (containing 1.6 g. of salicylidene-aminopenicillanic acid).

Next the adduct is dissolved in a mixed solvent of 20 ml. of acetone and 10 ml. of water, and a solution of 1.6 g. of 3-(2′,6′-dichlorophenyl)-5-methylisoxazole-4-carbonyl chloride in 10 ml. of acetone is dropped into the reaction mixture maintained at a temperature of 20° C. During the treatment, an aqueous solution of 1 N sodium bicarbonate is added little by little to keep the pH of the mixture between 3.1 and 3.5. After completion of the addition, stirring is continued for another half hour. The acetone is distilled off from the reaction mixture, and the residue is extracted with ether. The ether extract is dried over anhydrous sodium sulfate, and 2.5 ml. of a 2 N n-butanol solution of the sodium salt of α-ethylhexanoic acid is added to the dried extract. Colorless microcrystals which precipitate are isolated by filtration and washed with ether to give 2.45 g. of sodium 6-[3-(2′,6′-dichlorophenyl) - 5 - methyl - 4 - isoxazolecarboxamido]-penicillanate.

EXAMPLE 3

4.8 g. of salicylaldehyde is added to 500 ml. of the filtrate from hydrolysis of fermented broth of penicillin G (containing 4,320 mg. 1. of 6/APA) the pH of the solution is adjusted to 6.5, and the mixture is stirred for 2 hours. To the reaction mixture is added 500 ml. of ethyl acetate, followed by addition of 10 ml. of 1 M aqueous phosphoric acid under cooling with ice, and the mixture is stirred. The organic layer is separated and dried with sodium hydride, and the solvent is distilled off from the solution. After adding 10 ml. of cyclohexane to the residue and stirring the mixture sufficiently, most of the cyclohexane is decanted and the remaining solvent is further distilled off to yield 4.5 g. of a crude addition compound (containing 2.1 g. of salicylidene-amino-penicillanic acid).

Next the adduct is dissolved in a mixed solvent of 40 ml. of acetone and 20 ml. of water, and a solution of 1.8 g. of 3-(o-chlorophenyl)-5-methylisoxazole-4 - carbonyl chloride in 15 ml. of acetone is dropped into the reaction mixture at a temperature of 20° C., while the pH of the solution is maintained at a pH of 3.0–3.5 by portionwise addition of a 1 N aqueous sodium hydroxide solution. Treatment of the reaction mixture after completion of the reaction in the same manner as in Example 2 gives 2.8 g. of sodium 6-[3-(o-chlorophenyl)-5-methyl-4-isoxazole - carboxamido]-penicillanate.

EXAMPLE 4

The reaction is carried out exactly in the same manner as in Example 3, and the adduct compound thus obtained is extracted with 500 ml. of methyl ethyl ketone. The extract is concentrated to 60 ml. and 20 ml. of water is added to the concentrate and, while vigorously stirring the mixture, a solution of 3.2 g. of 3-(2',6'-dichlorophenyl)-5-methylisoxazole-4-carbonyl chloride in 10 ml. of acetone and an aqueous solution of 1 N sodium hydroxide are simultaneously dropped into the mixture, at a temperature of 20° C. while maintaining its pH between 3.0 and 3.5. Treatment of the reaction mixture after completion of the reaction in the same manner as in Example 2 gives 2.5 g. of sodium 6-[3[(2',6'-dichlorophenyl)-5-methyl - 4 - isoxazolecarboxamido]-penicillanate.

EXAMPLE 5

The reaction is carried out in the same manner as in Example 2 except that a double quantity of each starting material is used. 5.6 g. of the adduct obtained by similar treatment is dissolved in a solvent mixture consisting of 40 ml. of isopropanol and 20 ml. of water and, while stirring the reaction mixture at a temperature of 20° C., a solution of 3.2 g. of 3-(2',6'-dichlorophenyl)-5-methylisoxazole-4-carbonyl chloride in 20 ml. of ether is dropped into it. During this operation, the pH of the solution is maintained between 2.8 and 3.0 by adding 1 N aqueous sodium bicarbonate. Treatment of the reaction mixture in the same manner as in Example 2 after stirring it for 30 minutes gives 4.9 g. of sodium 6-[3-(2',6' - dichlorophenyl) - 5-methyl-4-isoxazolecarboxamido]-penicillanate.

EXAMPLE 6

The adduct obtained in the same manner as in Example 5, weighing 5.6 g. is dissolved in a solvent mixture consisting of 50 ml. of dioxane and 25 ml. of water, and into this solution, stirred at a temperature of 10° C., is dropped a solution of 3.2 g. 3-(2',6'-dichlorophenyl)-5 - methylisoxazole-4-carbonyl chloride in 10 ml. of dixoane. During this operation, 1 N aqueous sodium hydroxide is added to maintain the pH of the reaction mixture between 3.0 and 3.5. The reaction is continued for one additional hour, followed by treatment of the reaction mixture in the same manner as in Example 2 to give 4.6 g. of sodium 6-[3-(2', 6'-dichlorophenyl)-5-methyl - 4 - isoxazolecarboxamido]-penicillanate.

EXAMPLE 7

The adduct, weighing 4.42 g., obtained by the same reaction and after treatment as in Example 1, is dissolved in a solvent mixture consisting of 80 ml. of acetone and 20 ml. of water, and into the thus prepared solution, stirred under cooling with ice is dropped, a solution of 2.85 g. of 3-(o-chlorophenyl)-5-methylisoazole-4-carbonyl chloride in 15 ml. of acetone. During this operation the pH of the reaction mixture is maintained between 3 and 3.7 by adding 1 N aqueous sodium hydroxide. Treatment of the reaction mixture in the same manner as in Example 1 for one hour gives 4.09 g. of sodium 6-[3-(o-chlorophenyl)-5-methyl-4-isoxazolecarboxamido]-penicillanate.

EXAMPLE 8

The adduct, weighing 5.6 g., obtained in the same manner as in Example 5, is dissolved in a solvent mixture consisting of 40 ml. of acetone and 20 ml. of water, and into the thus prepared solution, stirred at a temperature of 20° C., is dropped a solution of 2.8 g. of 3-(o-chlorophenyl)-5-methylisoxazole-4-carbonyl chloride in 20 ml. of acetone. During this operation the pH of the reaction mixture is maintained between 3.2 and 3.5 by adding 1 N aqueous sodium hydroxide little by little. Treatment of the reaction mixture in the same manner as in Example 2 after reaction for 30 minutes gives 4.55 g. of soidum 6-[3-(o-chlorophenyl)-5-methyl - 4 - isoxazolecarboxamido]-penicillanate.

EXAMPLE 9

The reaction and after treatment are carried out in the same manner as in Example 6, except that 2.85 g. of 3-(o-chlorophenyl)-5-methylisoxazole-4 - carbonyl chloride is used in place of 3.2 g. of 3-(2',6'-dichlorophenyl)-5-methylisoxazole-4-carbonyl chloride, giving 4.37 g. of sodium 6-[3-(o-chlorophenyl)-5-methyl-4-isoxazolecarboxamido]-penicillanate.

EXAMPLE 10

The reaction and after treatment are carried out in the same manner as in Example 5, except that 2.85 g. of 3-(o-chlorophenyl)-5-methylisoxazole-4-carbonyl chloride is used in place of 3.2 g. of 3-(2',6'-dichlorophenyl)-5-methylisoxazole-4-carbonyl chloride, giving 4.35 g. of sodium 6-[3-(o-chlorophenyl)-5 - methyl - 4 - isoxazolecarboxamido]-penicillanate.

EXAMPLE 11

The adduct, weighing 4.42 g., obtained through the same reaction and after treatment as in Example 1, is dissolved in a solvent mixture consisting of 90 ml. of acetone and 4 ml. of water, and into the thus prepared solution, cooled with a freezing mixture and stirred, is added 3.5 g. of powdered DL-α-phenylglycyl chloride hydrochloride little by little. During this operation the pH of the reaction mixture is maintained between 1.5 and 2.3 by adding 1 N aqueous sodium hydroxide. After adding all the reactants followed by stirring for another 10 minutes, 1 N aqueous sodium hydroxide is added to the reaction mixture to adjust its pH to 5 and the insoluble mass is removed by filtration. The acetone is distilled off from the filtrate under reduced pressure and impurities are extracted from the residue with ether. Hydrochloric acid is added to the aqueous layer to adjust the pH to 2 and impurities are extracted with methyl isobutyl ketone. Next, the aqueous layer is extracted with two portions of a solution of 4.45 g. of bis-(2-ethylhexyl) sodium sulfosuccinate in 100 ml. of methyl isobutyl ketone. After drying the extract over anhydrous sodium sulfate, triethylamine is added to it. Crystals which separate in the reaction mixture are collected by filtration, washed successively with methyl isobutyl ketone and ether, and dried in vacuum to give 2.4 g. of 6-(2-amino-2-phenylacetamido)-penicillanic acid.

EXAMPLE 12

The reaction and after treatment are carried out exactly in the same manner as in Example 2, and 5.6 g. of the adduct is dissolved in a solvent mixture consisting of 90 ml. of acetone and 20 ml. of water. The subsequent reaction and after treatment are conducted with 3.5 g. of DL-α-phenylglycyl chloride hydrochloride in the same manner as in Example 11 to give 2.6 g. of 6-(2-amino-2-phenylacetamido)-penicillanic acid.

EXAMPLE 13

The reaction and after treatment are carried out in the same manner as in Example 2 except that 0.93 g. of phenyl acetyl chloride is used in place of 1.6 g. of 3-(2',6'-dichlorophenyl)-5-methylisoxazole - 4 - carbonyl chloride followed by final treatment with potassium α-ethylhexanoate in place of sodium α-ethylhexanoate to give 1.68 g. of potassium 6-phenylacetamido-penicillanate.

EXAMPLE 14

The reaction and after treatment are carried out in the same manner as in Example 6 except that 1.95 g. of phenoxyacetyl chloride is used in place of 3.2 g. of 3-(2',6'-dichlorophenyl)-5-methylisoxazole-4-carbonyl chloride to give 3.45 g. of sodium 6-phenoxyacetamidopenicillanate.

EXAMPLE 15

To 1.05 g. of 2,6-dimethoxybenzoic acid is added 2.5 ml. of thionyl chloride, the mixture is allowed to stand at room temperature for 30 minutes and the volatile materials are distilled off under reduced pressure. The residue is dissolved in 10 ml. of acetone. The solution is used in place of the solution of 3-(2',6'-dichlorophenyl)-5-methylisoxazole-4-carbonyl chloride of Example 2, and the reaction is carried out in the same manner as in said example except that ice cooling is applied. After appropriate after treatment, 1.64 g. of sodium 6-(2',6'-dimethoxybenzamido)-penicillanate is obtained.

EXAMPLE 16

The reaction and after treatment are carried out in the same manner as in Example 2 except that 2.1 g. of α-azidophenylacetyl chloride is used in place of 1.6 g. of 3-(2',6'-dichlorophenyl)-5-methylisoxazole-4-carbonyl chloride to give 1.4 g. of sodium 6-(2-azido-2-phenylacetamido)-penicillanate.

EXAMPLE 17

The reaction and after treatment are carried out in the same manner as in Example 2 except that 1.23 g. of α-bromophenylacetyl chloride is used in place of 1.6 g. of 3-(2',6'-dichlorophenyl) - 5 - methylisoxazole-4-carbonyl chloride to give 1.5 g. of sodium 6-(2-bromo-2-phenylacetamido)-penicillanate.

EXAMPLE 18

In 80 ml. of ether is dissolved 1.8 g. of N-o-nitrophenylsulfenyl-α-phenylglycine, and 1.8 g. of phosphorous pentachloride powder is added to the solution, which is then stirred for 1 hour. After removing the insoluble materials by filtration, ether is distilled off from the filtrate and the residue is dissolved in 20 ml. of acetone. The same reaction procedure and after treatment as in Example 2 are carried out except that the solution obtained as above is used instead of the solution of 1.6 g. of 3-(2',6'-dichlorophenyl)-5-methylisoxazole-4-carbonyl chloride to give 1.7 g. of sodium 6-[2-(o-nitrophenylsulfenylamino)-2-phenylacetamido]-penicillanate.

EXAMPLE 19

In 30 ml .of chloroform is dissolved 1.88 g. of N-(2-p-toluenesulfonylethoxycarbonyl) - α - phenylglycine and 30 ml. of thionyl chloride is added to the solution, which is then heated for about 10 minutes on a water bath. The volatile materials are distilled off the reaction mixture, and the residue is dissolved in 10 ml. of acetone. The same reaction procedure and after treatment as in Example 2 are carried out except that the solution obtained as above is used instead of the solution of 3-(2',6'-dichlorophenyl)-5-methylisoxazole-4-carbonyl chloride to give 2.0 g. of sodium 6 - [2-(2-p-toluenesulfonylethoxycarbonylamino)-2-phenylacetamido]-penicillanate.

EXAMPLE 20

After subjecting to heating under reflux for 30 minutes a mixture consisting of 1.3 g. of β-methoxynaphthalenecarboxylic acid, 6 ml. of thionyl chloride and 20 ml. of benzene, the solvent and volatile materials are distilled off the reaction mixture. The residue is dissolved in 10 ml. of acetone. The same reaction procedure and after treatment as in Example 2 are carried out except that the solution obtained as above is used instead of the solution of 3-(2',6'-dichlorophenyl)-5-methylisoxazole-4-carbonyl chloride to give 2.0 g. of sodium 6-(2-methoxy-1-naphthamido)-penicillanate.

EXAMPLE 21

The acid chloride of α-phenoxypropionic acid is produced by using 1.5 g. of said acid in place of 1.3 g. of β-methoxynaphthalenecarboxylic acid of Example 20, and the acetone solution of the product is prepared. The same reaction procedure and after treatment as in Example 2 are carried out except that the solution obtained as above is used instead of the solution of 3-(2',6'-dichlorophenyl)-5-methylisoxazole-4-carbonyl chloride to give 1.8 g. of sodium 6-(2-phenoxypropionamido)-penicillanate.

EXAMPLE 22

In a solvent mixture of 20 ml. of acetone and 10 ml. of water is dissolved 2.8 g. of adduct (containing 1.6 g. of 6-salicylideneaminopenicillanic acid) of 6-salicylideneaminopenicillanic acid and salicylaldehyde prepared in the same manner as in Example 2, and 0.89 g. of α-phenylglycine N-carboxy-anhydride is added to the solution, which then is stirred for 3 hours at a temperature of 0° with its pH being adjusted to 5. By treating the reaction product in the same manner as in Example 11, 0.9 g. of 6-(2-amino-α - phenylacetamido) - penicillanic acid is obtained.

EXAMPLE 23

To 2.3 g. of adduct (containing 1.6 g. of 6-salicylideneaminopenicillanic acid) of 6-salicylideneaminopenicillanic acid and salicylaldehyde prepared in the same manner as in Example 2 are added 3 ml. of acetone and 1.2 g. of α-phenylglycine N-thiocarboxylic anhydride, and the reaction mixture is allowed to stand for one hour at 35° C. 30 ml. of methyl isobutyl ketone and 30 ml. of water are added to the reaction mixture to adjust its pH to 2, and the mixture is stirred for 20 minutes. Treatment of the separated aqueous layer in the same manner as in Example 11 gives 1.4 g. of 6-(2-amino-α-phenylacetamido)-penicillanic acid.

What is claimed is:

1. In a process for producing 6-acylaminopenicillanic acids of the group consisting of
    6-(2-phenylacetamido)-penicillanic acid,
    6-(2-phenoxyacetamido)-penicillanic acid,
    6-(2-phenoxypropionamido)-penicillanic acid,
    6-(2,6-dimethoxybenzamido)-penicillanic acid,
    6 - (3 - phenyl-5-methyl-4-isoxazolecarboxamido)-penicillanic acid,
    6 - [3 - (o-chlorophenyl)-5-methyl-4-isoxazolecarboxamido]-penicillanic acid,
    6 - [3 - (2,6-dichlorophenyl)-5-methyl-4-isoxazolecarboxamido]-penicillanic acid,
    6-(2-amino-2-phenylacetamido)-penicillanic acid,
    6-(2-azido-2-phenylacetamido)-penicillanic acid,
    6-(2-bromo-2-phenylacetamido)-penicillanic acid,
    6 - [2 - (p - toluenesulfonylethoxycarbonylamino)-2-phenylacetamido]-penicillanic acid,
    6-(β-methoxypropionamido)-penicillanic acid,
    6 - [2 - (o - nitrophenylsulfenylamino)-2-phenylacetamido]-penicillanic acid,
    6-(2-methoxy-1-naphthamido)-penicillanic acid,
    6-(2-ethoxy-1-naphthamido)-penicillanic acid, and salts thereof,
the improvement which comprises forming 6-salicylideneamino-penicillanic acid-salicylaldehyde adduct by adding to a fermented broth containing 6-aminopenicillanic acid two moles or more salicylaldehyde per mole of said 6-aminopenicillanic acid, then acylating said adduct, respectively, with
    phenylacetic acid,
    phenoxyacetic acid,
    phenoxypropionic acid,
    2,6-dimethoxybenzoic acid,
    3-phenyl-5-methylisoxazole-4-carboxylic acid,
    3 - (o-chlorophenyl) - 5-methylisoxazole-4-carboxylic acid,
    3 - (2',6', - dichlorophenyl) - 5-methylisoxazole-4-carboxylic acid,
    phenylglycine,
    α-azidophenylglycine,
    α-bromophenylglycine,
    N - (2 - p - toluenesulfonylethoxycarbonyl)-α-phenylglycine,
    β-methoxypropionic acid,
    N-o-nitrophenylsulfenyl-α-phenylglycine,
    β-methoxynaphthalenecarboxylic acid or
    β-ethoxynaphthalenecarboxylic acid,
or ester, acid halide or acid anhydride thereof.

2. A process as in claim 1 wherein the adduct is reacted with 3 - (2',6',-dichlorophenyl)-5-methylisoxazole-4-carbonyl chloride.

3. A process as in claim 1 wherein the adduct is reacted with 3 - (o-chlorophenyl)-5-methylisoxazole-4-carbonyl chloride.

4. A process as in claim 1 wherein the adduct is reacted with α-phenylglycyl chloride or its hydrochloride.

5. A process as in claim 1 wherein the adduct is reacted with phenylacetyl chloride.

6. A process as in claim 1 wherein the adduct is reacted with phenoxyacetyl chloride.

7. A process as in claim 1 wherein the adduct is reacted with α-azidophenylacetyl chloride.

8. A process as in claim 1 wherein the adduct is reacted with α-bromophenylacetyl chloride.

9. A 1:1 adduct of 6-salicylideneamino-penicillanic acid and salicylaldehyde.

References Cited
UNITED STATES PATENTS 3,288,800  11/1966  Heuser et al. _____ 260—239.1

NICHOLAS S. RIZZO, Primary Examiner

U.S. Cl. X.R.

424—271